(12) United States Patent
Chen

(10) Patent No.: US 12,118,424 B2
(45) Date of Patent: Oct. 15, 2024

(54) PHYSICAL CARD CAPABLE OF IMPROVING AUTHENTICITY IDENTIFICATION AND METHODS OF USING THEREOF

(71) Applicants: NET ALLIANCE CO., LTD., New Taipei (TW); Chi-Ching Chen, New Taipei (TW)

(72) Inventor: Chi-Ching Chen, New Taipei (TW)

( * ) Notice: Subject to any disclaimer, the term of this patent is extended or adjusted under 35 U.S.C. 154(b) by 0 days.

(21) Appl. No.: 18/366,326

(22) Filed: Aug. 7, 2023

(65) Prior Publication Data

US 2023/0394258 A1 Dec. 7, 2023

Related U.S. Application Data

(62) Division of application No. 17/666,823, filed on Feb. 8, 2022.

(30) Foreign Application Priority Data

Feb. 9, 2021 (TW) .................................. 110105118
Jun. 25, 2021 (TW) .................................. 110123414

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC .................................................. G06K 7/10366
USPC ......................................................... 235/451
See application file for complete search history.

(56) References Cited

FOREIGN PATENT DOCUMENTS

| CN | 201828944 U | 5/2011 |
| CN | 102214317 A | 10/2011 |
| CN | 104253634 A | 12/2014 |
| CN | 104619021 B | 11/2018 |
| TW | 201535285 A | 9/2015 |
| TW | 201901548 A | 1/2019 |

*Primary Examiner* — Rafferty D Kelly
(74) *Attorney, Agent, or Firm* — Rosenberg, Klein & Lee

(57) ABSTRACT

The present invention provides a physical card capable of improving authenticity identification and a method of using thereof. The physical card is provided with two electronic tags of different wavebands. When a physical card is to be traded, the purchaser can perform an appearance inspection of the physical card, or use a first reader in the purchaser's mobile phone to directly read a high-frequency electronic tag of the physical card and obtain a card first information, so that purchaser can quickly and automatically determine the authenticity of the physical card. In addition, an UHF electronic tag in the physical card can be read by a second reader of a verification agency, and then a second information of the physical card can be obtained. Since the physical card is used without leaving the holder of the physical card during the whole process, the contactless transaction mode maintains a social safety distance, which can improve the security of the physical card when in use.

5 Claims, 11 Drawing Sheets

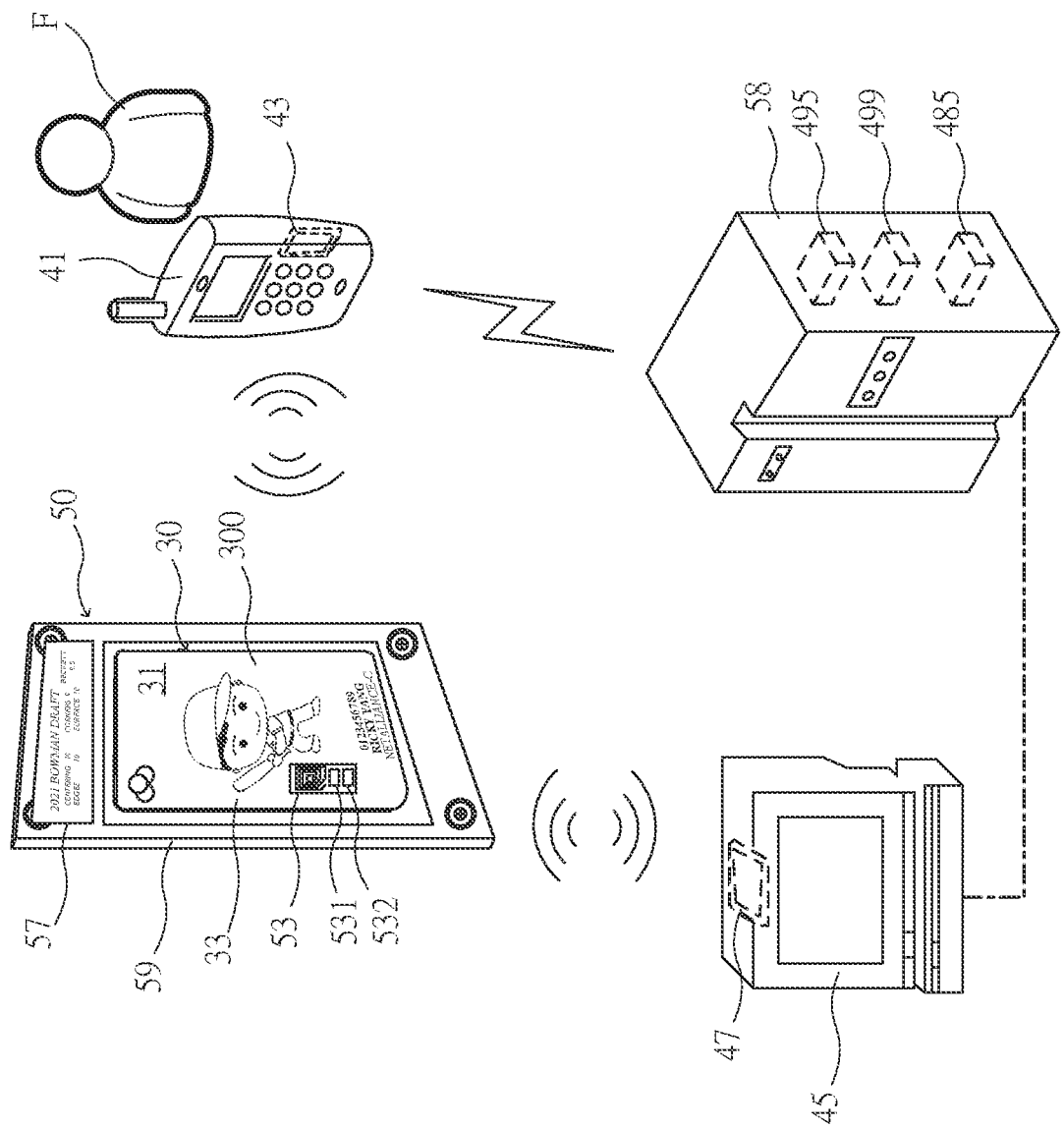

PHYSICAL CARD CAPABLE OF IMPROVING AUTHENTICITY IDENTIFICATION AND METHODS OF USING THEREOF

REFERENCE TO RELATED APPLICATIONS

This non-provisional application claims priority claim under 35 U.S.C. § 119(a) on Taiwan Patent Application No. 110105118 (filed Feb. 9, 2021) and No. 110123414 (filed Jun. 25, 2021), the entire contents of which are incorporated herein by reference.

FIELD OF THE INVENTION

The present invention relates to a physical card and method of using thereof. The front surface of the physical card is provided with a visually recognizable image data, and the physical card is provided with a plurality of electronic tags, which can be read by different readers.

BACKGROUND

The conventional physical card is shown in FIG. 1. Conventional physical cards 10, such as player cards, star cards, game cards, and/or religious cards, have a main image data 13 on the front surface 11 of the card body 100, and a secondary image data (not shown) on the back side of the card body 100. Taking a player card as an example, the main image data 13 may include a plain text, player's portrait, name, team, card year and/or card company name, etc., while the secondary image data may include a player's height, weight, birthday, nationality, graduation school, draft ranking, defensive position, competition results and/or important deeds, etc. The physical card 10 can be used as a tool for collection, exchange, trading, and investment. The value of a player card 10 can range from a few cents to millions of dollars. For example, in 2020, a baseball card will be close to sold for USD 4 million. Therefore, how to determine the authenticity of the physical card 10 and reduce the risk of being stolen has become an important issue.

There are several professional appraisal units that can assist in verifying the authenticity and the preservation status of the physical card 10, such as PSA, BGS, SCG, and Beckett. When an unidentified physical card 10 (also called a naked card) is sent to a professional appraisal unit for appraisal, the appraisal unit can verify the authenticity of the naked card and the player's signature. Moreover, the appraisal unit can provide an appraisal score according to the protection status of the physical card 10. As shown in FIG. 2, the authenticated physical card 10 will be placed in a protective casing 29, and an authentication information 27 will be added to the top of the protective casing 29 to become a graded card 20. The authentication information 27 includes the name of an appraisal unit, the appraisal grade of each item, the final grade, the card number, the date graded, the set number, the player's name and other information.

When the physical card 10 or the graded card 20 is auctioned or traded, although the purchaser can initially confirm the authenticity and preservation status of the physical card 10 or the graded card 20 according to the appearance of the card, the main image data 13, plain number or authentication information 27. However, the current physical card 10 or the graded card 20 has the following shortcomings: (1). The naked card can only visually identify the card and the main image data 13, so that it is difficult to confirm the authenticity of the physical card; (2). The card appraisal procedure not only requires appraisal fees, but also takes several weeks to several months for the round-trip time. It is impossible to judge the authenticity of the card immediately; (3). When the physical card is sent for appraisal, the card is often lost in the post; (4). The physical card or the graded card is easy to be counterfeited, forged, or stolen; and (5). The physical card has only a single use function.

SUMMARY

It is a primary object of the present invention to provide a physical card that can improve the disadvantages of the current physical card. At least one electronic tag is additionally provided inside the physical card, and the purchaser can obtain the card's primary data in the physical card in real time through the primary reader of his own handheld communication device. This can quickly and self-identify the authenticity of the physical card, especially suitable for the naked card.

It is another object of the present invention to provide a physical card, through the physical card is equipped with two different wavebands of electronic tags, wherein the high-frequency electronic tags can be read out the first information (basic card data) through a first reader and/or pay fees. In addition, the ultra-high frequency electronic tag can be read out the second information (advanced card data) of the physical card through a second reader. The first information or the second information can record the previous transaction information of the physical card or the identity data of the current owner, thereby reducing the chance of counterfeit or stolen cards.

It is another object of the present invention to provide a method for using a physical card. The physical card is equipped with at least two electronic tags of different wavebands, one of which is an ultra-high frequency (UHF) RFID tag, which can remotely identify the identity of the card holder, and the other is a high-frequency RFID tag, which can be exchanged for tickets or enter the service at a close spacing, thereby increasing the scope of use of physical cards.

It is another object of the present invention to provide a method for using a physical card. By providing at least two electronic tags with different wavebands in the physical card, the physical card does not need to leave the card holder during use, which is non-contact trading mode. Maintaining social safety spacing during the epidemic prevention period can not only reduce the risk of card theft, but also reduce the channels for the physical card to be infected with bacteria, so it can improve the safety of use.

It is another object of the present invention to provide a method for using a physical card. The physical card is provided with a high-frequency electronic tag and a UHF electronic tag, wherein the UHF electronic tag can remotely identify the identity of the card holder, and another high-frequency electronic tag can be identified at close range, paid and exchanged for goods or services. This can increase the use function of physical cards and reduce the time for commodity transactions.

It is another object of the present invention is to provide a method for using a physical card. The physical card is equipped with a high-frequency electronic tag and an ultra-high frequency electronic tag. The ultra-high frequency electronic tag can be detected at a long spacing from the entrance, and can read the second information of the physical card, so that merchants can determine early whether there is an epidemic-related person who wants to enter the mall, and can respond early prevention measures to maintain a safe shopping environment for members.

To achieve the above objective, the present invention provides a physical card capable of improving authenticity identification, comprising: a main image data, presented on a front surface of said physical card; at least one high-frequency electronic tag, configured in said physical card and used for generating a high-frequency signal that includes a first information of said physical card, and said high-frequency signal can be read by a first reader that is provided in a communication device or owned by a seller; and at least one ultra-high frequency electronic tag, configured in said physical card and used for generating an ultra-high frequency signal that includes a second information of said physical card, and the ultra-high frequency signal can be read by a second reader that is provided by a certification organization or owned by said seller.

In one embodiment of the present invention, wherein said high-frequency electronic tag can be a low-frequency RFID tag, a high-frequency RFID tag or a near-field communication tag; said UHF electronic tag can be a UHF RFID tag or a microwave RFID tag; said physical card is a player card, a game card, a star card, a religious card, a buddha card, a gift card, a credit card, a financial card, a membership card or a VIP card; and said second information further includes a card member list.

In one embodiment of the present invention, further comprising an authentication information, said physical card and said authentication information can be covered by a protective casing.

In one embodiment of the present invention, wherein said first information includes a first internal code, and said second information includes a second internal code that can correspond to said first internal code.

In one embodiment of the present invention, wherein said high-frequency electronic tag and said ultra-high frequency electronic tag can be integrated into an electronic tag with multiple different wavebands, said electronic tag used for generating said high-frequency signal and said ultra-high frequency signal.

In one embodiment of the present invention, wherein said high-frequency electronic tag comprising a first electronic wallet, and said first reader deducts a commodity payment from said first electronic wallet by reading said high-frequency signal.

In one embodiment of the present invention, wherein said ultra-high frequency electronic tag comprising a second electronic wallet, and said second reader deducts said commodity payment from said second electronic wallet by reading said ultra-high frequency signal, and said first electronic wallet is connected to said second electronic wallet.

The present invention further provides a method for using the physical card, wherein said first reader is set at a commodity exchange counter, and said second reader is set at an entrance of a store, comprising: completing an order of a commodity, a holder of said physical card becomes a member or a commodity exchanger; detecting whether said second reader has read said ultra-high frequency signal of said physical card; taking out said commodity by a staff of said store when said second reader reads said ultra-high frequency signal; confirming whether said first reader has read said high-frequency signal of said physical card; and delivering said commodity to the holder of said physical card after said first reader reads said high-frequency signal.

In one embodiment of the present invention, further comprising: providing a member fast lane, the holder of said physical card can pass to the commodity exchange counter.

In one embodiment of the present invention, further comprising: obtaining an order number when the holder of said physical card completes said order; and deducting a commodity payment from a first electronic wallet of said physical card or marks a received message in said physical card when said first reader reads said high-frequency signal with said order number.

In one embodiment of the present invention, further comprising: transferring an amount to said first electronic wallet from a second electronic wallet of said physical card if said first electronic wallet is lower than the commodity payment, wherein said first electronic wallet is set on said high-frequency electronic tag, and said second electronic wallet is set on said ultra-high frequency electronic tag.

The present invention further provides a method for using the physical card, wherein said first reader and said second reader will move with a staff of said seller, comprising: completing an order of a commodity, a holder of said physical card becomes a member or a commodity exchanger; carrying said commodity to a delivery location designated by said holder; detecting and reading said high-frequency signal by said first reader to confirm whether said holder is said commodity exchanger; reading said ultra-high frequency signal by said second reader to confirm whether said holder is the commodity exchanger if said first reader cannot read said high-frequency signal; and delivering said commodity to said holder if said holder is said commodity exchanger.

In one embodiment of the present invention, further comprising: presenting a plain text of said physical card by said holder to confirm whether said holder is said commodity exchanger when said second reader has read a plurality of said ultra-high frequency signals.

In one embodiment of the present invention, further comprising: obtaining an order number when the holder of said physical card completes said order; and deducting a commodity payment from a first electronic wallet of high-frequency electronic tag or marks a received message in said physical card when said first reader reads said high-frequency signal with said order number.

In one embodiment of the present invention, further comprising: deducting a commodity payment from a second electronic wallet of said ultra-high frequency electronic tag, transferring an amount from a credit card to said second electronic wallet then deducting said commodity payment, marking an overdue message in said second electronic wallet, or paying for said commodity payment in cash when said second reader reads said ultra-high frequency signal.

In one embodiment of the present invention, further comprising: transferring an amount from a credit card to said first electronic wallet then deducting said commodity payment, marking an overdue message in said first electronic wallet, or paying for said commodity payment in cash if said first reader cannot deduct said commodity money from said first electronic wallet.

The present invention further provides a method for using the physical card, wherein said first reader and said second reader are set at an entrance of a store, comprising: walking a member fast lane when a member carrying said physical card; detecting and reading said ultra-high frequency signal by said second reader, and confirming whether said member is an epidemic-related person according to said second information or a card member list; providing a warning message by said store if said member is said epidemic-related person; asking said epidemic-related person move to a restricted area or leave said store; and allowing said member who is not said epidemic-related person to enter said store.

In one embodiment of the present invention, further comprising: reading said high-frequency signal of said physical card by said first reader, and confirming whether said member is said epidemic-related person according to said card member list or said first information of said physical card.

In one embodiment of the present invention, further comprising: closing said entrance of said store to confirm that said epidemic-related person has moved to said restricted area or left said store.

The present invention provides a physical card capable of improving authenticity identification, comprising: a main image data, presented on a front surface of said physical card; and at least one electronic tag, configured in said physical card and used for generating an electronic tag signal that includes a first information or a second information of said physical card, and said electronic tag signal can be read by a first reader that is provided in a communication device or owned by a seller.

BRIEF DESCRIPTION OF THE DRAWINGS

The structure as well as preferred modes of use, further objects, and advantages of this present disclosure will be best understood by referring to the following detailed description of some illustrative embodiments in conjunction with the accompanying drawings, in which:

FIG. 6 is a schematic diagram of the use of a physical card according to another embodiment of the present invention.

DETAILED DESCRIPTION OF THE PREFERRED EMBODIMENTS

Figure 1:
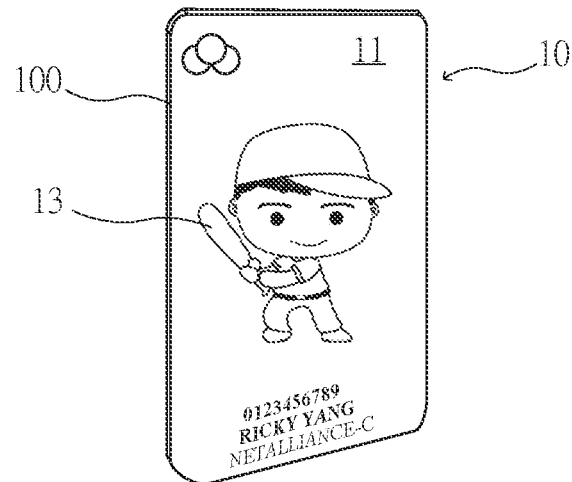
FIG. 1 is a schematic diagram of a physical card in the prior art.
Figure 2:
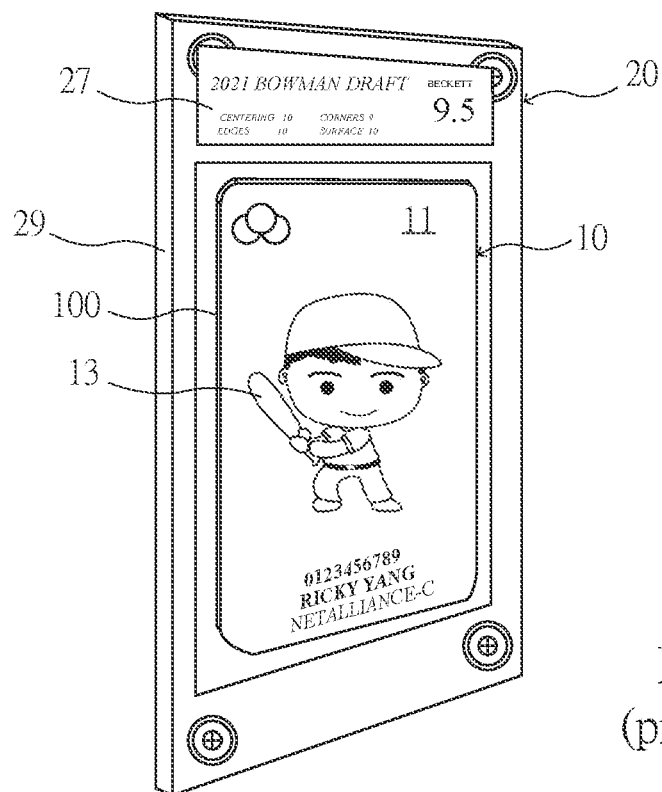
FIG. 2 is a schematic diagram of a graded card in the prior art.
Figure 3:
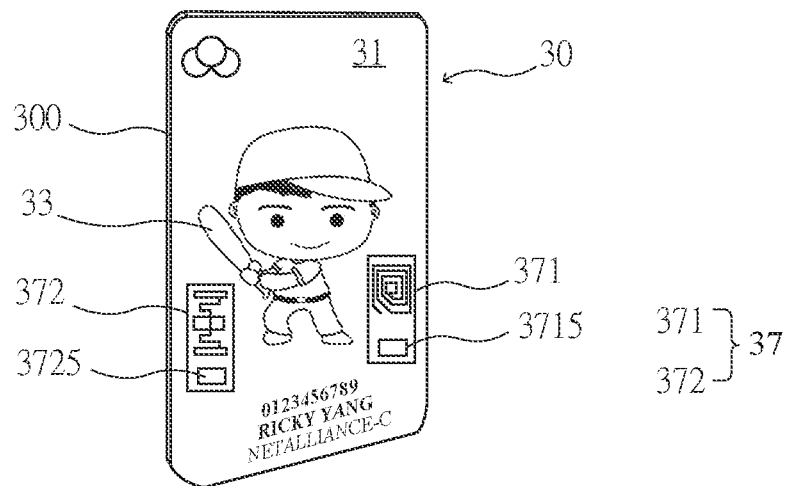
FIG. 3 is a schematic diagram of a physical card according to a preferred embodiment of the present invention.

Referring to FIG. 3, which is a schematic diagram of a preferred embodiment of the present invention. A physical card 30 of the present invention mainly has a main image data 33 presented on a front surface 31 of a card body 300, and a secondary image data (not shown) on the back surface of the card body 300. Taking a player card 30 as an example, the main image data 33 includes but not limited to the following: a plain text, a player portrait, name, team, card year, and/or card company name. The secondary image data includes but not limited to the following: a player's height, weight, birthday, nationality, graduation school, draft ranking, defensive position, and/or important deeds. The plain text is the number shown in FIG. 3. The physical card 30 of the present invention is provided with at least one electronic tag 37. If it is a single electronic tag, the electronic tag 37 can be selected as a Radio Frequency Identification Tag (RFID Tag) or a Near Field Communication Tag (NFC Tag).

In a preferred embodiment of the present invention, the physical card is provided with two electronic tags 37 of different wavebands, at least one high-frequency electronic tag 371 and at least one ultra-high frequency (UHF) electronic tag 372 respectively. The high-frequency electronic tag 371 which configured in the physical card 30 and used for generating a high-frequency signal 3715. The ultra-high frequency (UHF) electronic tag 372 which configured in the physical card 30 and used for generating an ultra-high frequency signal 3725. The high-frequency electronic tag 371 may be a low-frequency RFID tag (LF-RFID Tag), a high-frequency RFID tag (HF-RFID Tag), or a NFC Tag. The ultra-high frequency (UHF) electronic tag 372 can be a UHF-RFID Tag or a Microwave-RFID Tag. The physical card 30 may be a player card, a game card, a star card, a religious card, a Buddha card, a gift card, a credit card, an atm card, a stored-value card, a membership card and/or a VIP card.

Figure 4:
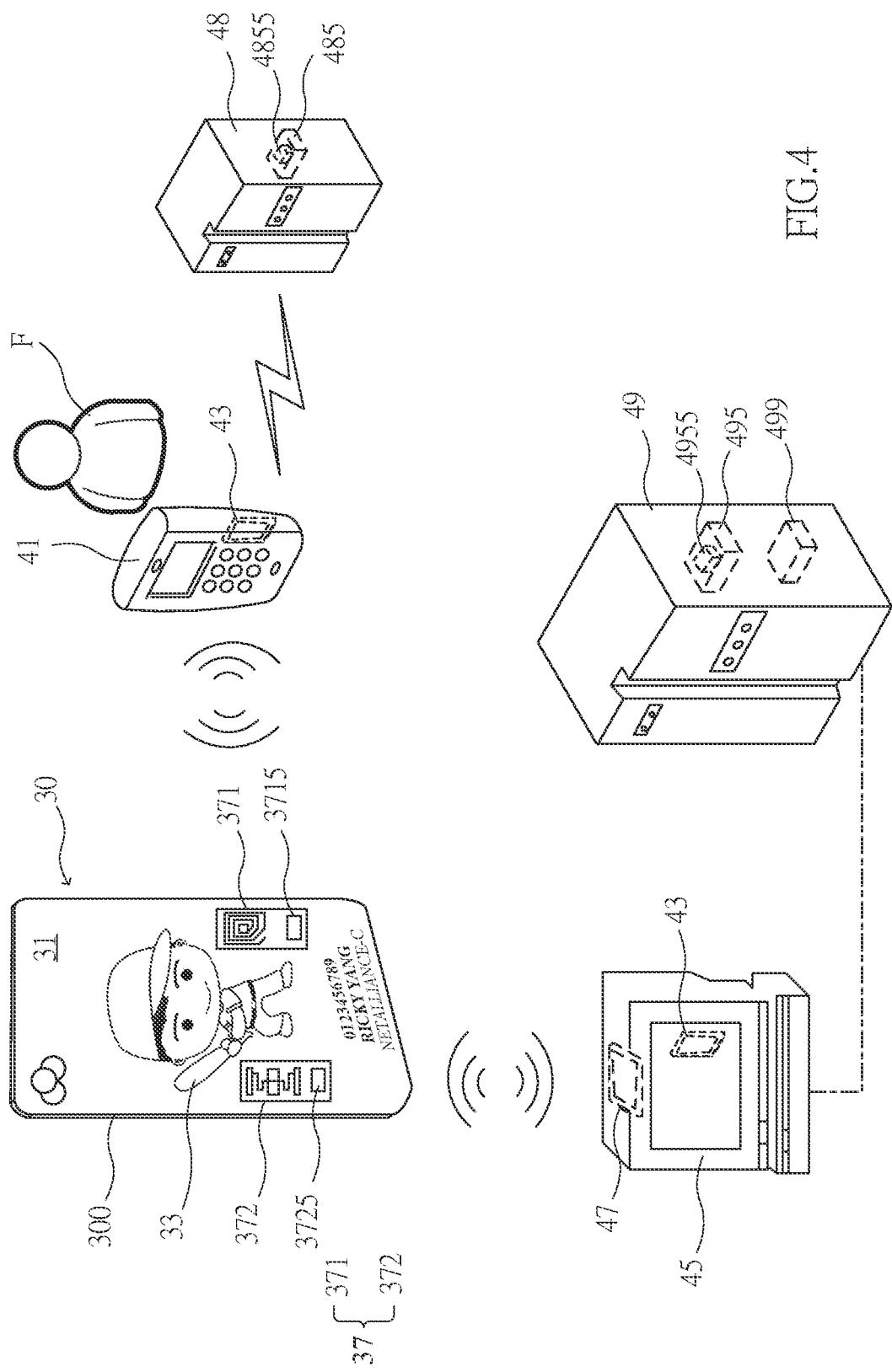
FIG. 4 is a schematic diagram of the use of a physical card according to an embodiment of the present invention.

Referring to FIG. 4, which is a schematic diagram of an embodiment of the present invention. When a physical card 30 is to be traded or exchanged, the purchaser F can not only initially check whether the front surface 31 or the main image data 33 of the physical card 30 is complete and correct, but also can use a first reader 43, such as a RFID first reader or a NFC first reader, built in a portable communication device 41 of the purchaser F or owned by a seller to read a high-frequency signal 3715 stored in the high-frequency electronic tag 371 of the physical card 30. The high-frequency signal 3715 includes a first information (a card elementary data) 485. The first information 485 is displayed on a display of the portable communication device 41. In this way, the purchaser F can identify and quickly determine the authenticity of the physical card 30 by himself, reducing the risk of buying a counterfeit card.

In another embodiment of the present invention, the high-frequency signal 3715 is the ID Code of the high-frequency electronic tag 371. The first information 485 including but not limited to the following: a card set number, player name, manufacturing company name, manufacturing date, and/or owner name of the physical card 30. The first information 485 can be stored in a first application system 48, and can also be stored in the high-frequency electronic tag 371 of the physical card 30.

The first reader 43 can be a built-in portable communication device 41 or a fixed first reader. The first reader 43 is connected to the first application system 48 to process the read data of the high-frequency electronic tag 371. The first application system 48 stores the first information 485 corresponding to the high-frequency signal 3715 of the physical card 30. The high-frequency signal 3715 includes the first information 485 of said physical card 30. The technology of the first reader 43 to read and display the high-frequency signal 3715 and/or the first information 485 has appeared in various Smart Card or Easy Card applications. The portable communication device 41 can be a smart phone, personal digital assistant (PDA), super mobile computer (UMPC), or notebook computer (NOTEBOOK).

In addition, in another embodiment of the present invention, in order to avoid purchasing a stolen physical card, the purchaser F or the seller can carry the physical card 30 to a certification organization 45, such as an authentication unit, a card transaction center, a card issuing center, a membership center or a store. A second reader 47 of the certification organization 45 or owned by the seller is used to read the high-frequency signal 3715 of the high-frequency electronic tag 371 and/or the UHF signal 3725 of the UHF electronic tag 372 in the physical card 30. The second reader 47 can be integrated internally or additionally connected to an advanced application system 49 to process and store a second information (a card advanced information) 495 corresponding to the UHF signal 3725 and/or the high-frequency signal 3715. The ultra-high frequency signal 3715 includes the second information 495 of said physical card 30. The second information 495 including but not limited to the following: the previous transaction records of a physical card 30, the name of the current holder, nationality, transaction year, transaction cost, identification time, and/or identification grade. The purchaser F can confirm whether the seller of the physical card 30 is a legal holder and whether it is a legal card according to the second information 495. Therefore, the authenticity and transaction security of the physical card 30 can be improved.

After the physical card 30 completes the transaction, the certification organization 45 can update a card member list 499 including transaction time, transaction fees and/or the name of the new holder, and store it in the advanced application system 49 or the second information 495, to be used as a reference for future card transactions. In this way, the risk of the physical card 30 being stolen and sold can be reduced.

In an embodiment of the present invention, the second information 495 and/or the card member list 499 can also be updated and stored in the UHF electronic tag 372. The high-frequency signal 3715 of the high-frequency electronic tag 371 and the UHF signal 3725 of the UHF electronic tag 372 are corresponding data.

In an embodiment of the present invention, the first information 485 includes a first internal code 4855, and the second information 495 includes a second internal code 4955. The first internal code 4855 and the second internal code 4955 correspond to each other. The certification organization 45 can read the second internal code 4955 by the second reader 47, and the first reader 43 can read the first internal code 4855. Compare the corresponding relationship between the first internal code 4855 and the second internal code 4955. If the corresponding relationship is correct, it means that the physical card 30 is a real card. Otherwise, if the relationship is not correct, it means that at least one electronic tag 37 of the physical card 30 has been forged, which is a counterfeit card. In this way, the judgment of the authenticity of the physical card 30 can be improved. The certification organization 45 is not only provided with a second reader 47, but can also be provided with a first reader 43 at the same time.

Figure 5:
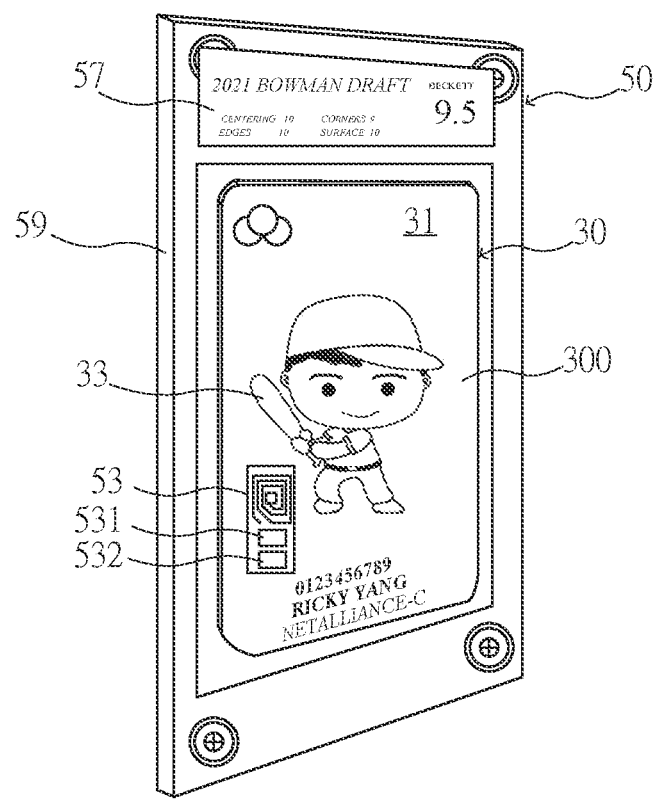
FIG. 5 is a schematic diagram of a physical card according to another embodiment of the present invention.

Referring to FIG. 5 and FIG. 6, which are schematic diagrams of the structure and use of another embodiment of the present invention. The present invention can be applied to an identification card 50. The identification card 50 includes a physical card 30 and an authentication information 57. A protective casing 59 is used to cover the physical card 30 and the authentication information 57. The physical card 30 includes at least one electronic tag 53, and the electronic tag 53 can store a high-frequency signal 531 and/or an ultra-high frequency (UHF) signal 532. In other words, the electronic tag 53 may store a high-frequency signal 531 individually, or a UHF signal 532 individually, or store both the high-frequency signal 531 and the UHF signal 532 at the same time. The electronic tag 53 can has multiple different wavebands. The high-frequency signal 531 of the electronic tag 53 can be read by a first reader 43, and the UHF signal 532 can be read by a second reader 47. It can reduce the time to identify the authenticity of the physical card 50, reduce the loss and theft of the physical card 50 when it is sent, and reduce the risk of buying a counterfeit card.

In an embodiment of the present invention, the first application system (48; see FIG. 4) can be integrated with the second application system (49) into an information application system 58. The information application system 58 may separately store a first information 485, a second information 495, and/or a card member list 499. The first information 485 can be provided to general consumers through the first reader 43 of a portable communication device 41 or a fixed device to connect. The second information 495 is only provided to a second reader 47 of the system operator, a supplier of physical cards or a certification organization 45 to connect.

Figure 7:
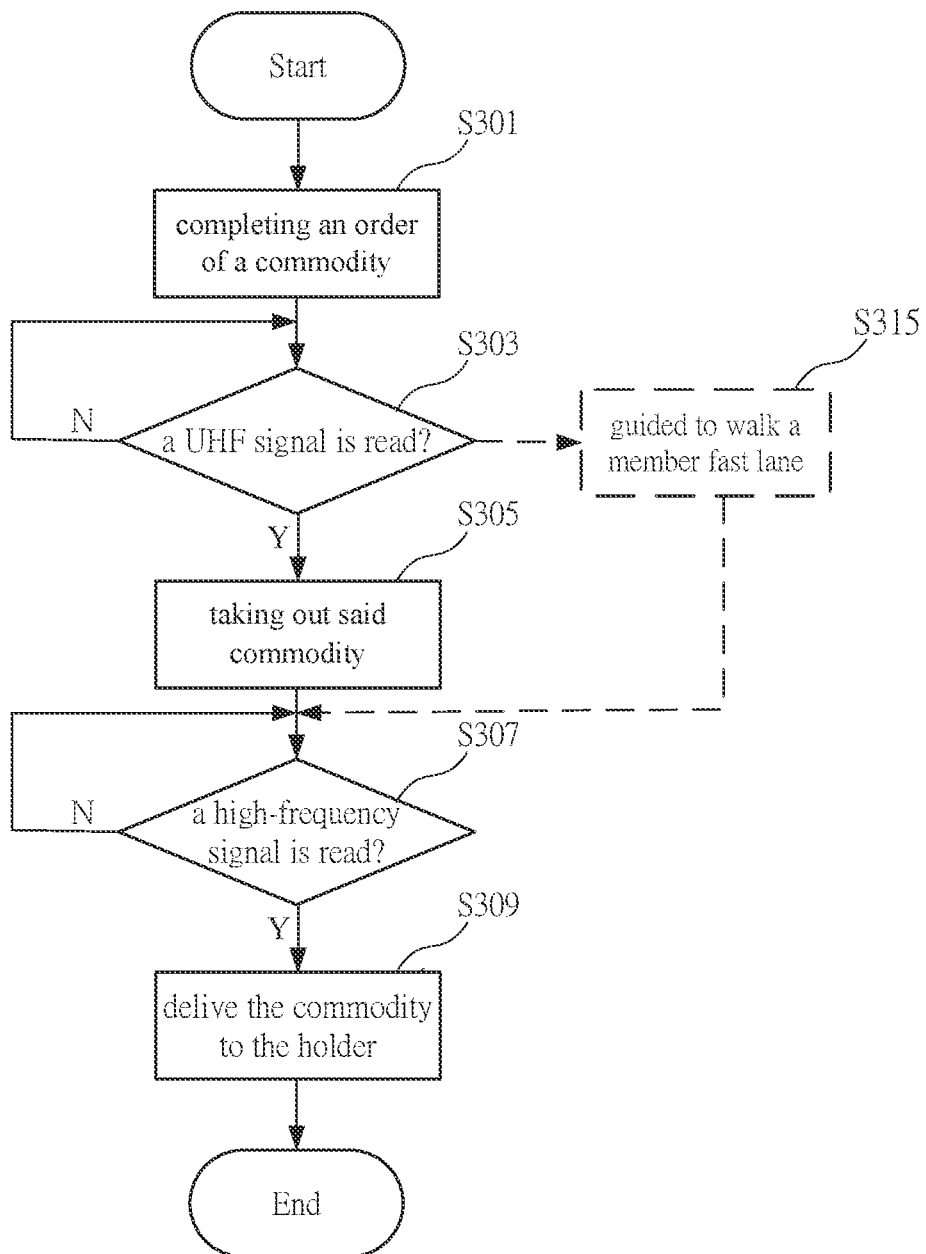
FIG. 7 is a flow chart of using a physical card according to another embodiment of the present invention.

Referring to FIG. 7, which is a schematic diagram of the use of an embodiment of the present invention. Please refer to FIG. 4 at the same time. The physical card 30 of the present invention can be used as a membership card or an identification card, and is used in a transaction of commodities, its use steps are as follows:

In step S301, a holder of a physical card 30 can complete an order of a commodity or a transaction with an organizer (or a store) to become a member or a commodity exchanger, and has the right to exchange a commodity with a seller or an organizer. The commodity can be a goods, a food, a ticket, an admission ticket, a service or a membership.

In step S303, the organizer and/or the store sets a second reader 47 at an entrance of a store to detect whether a UHF signal 3725 of a physical card 30 is read. If the UHF signal 3725 is read, proceed to step S305; otherwise, if the UHF signal 3725 is not read, continue the detection.

In step S305, according to the read UHF signal 3725, the staff of the store can know in advance which the holder with the physical card 30 have arrived at the scene, so the commodity to be exchanged can be prepared in advance.

In step S307, the physical card 30 arrives at a commodity exchange counter, and the staff can confirm through a first reader 43 whether the high-frequency signal 3715 of the physical card 30 is read. If the high-frequency signal 3715 is read, step S309 is performed. Otherwise, continue to wait and detect. Of course, when the holder of the physical card 30 arrives at the commodity exchange counter, he can also actively move the physical card 30 to the position of the first reader 43, and actively allow the first reader 43 to read the high-frequency signal 3715.

In step S309, the first reader 43 reads the high-frequency signal 3715, which indicates that the holder with the physical card 30 have been confirmed and are ready to complete the exchange of commodity. The staff of the store can deliver the commodity to the holder of the physical card 30 to complete the transaction.

In another embodiment of the present invention, a step S315 can be added after step S303. After the second reader 47 of the commodity exchange counter detects and reads the UHF signal 3725, the holder of the physical card 30 will be guided to walk a member fast lane for other purchases. In this way, the holder of the physical card can be quickly guided to the commodity exchange counter and completed the exchange of the commodity, and it can also highlight the dignity of the holder of the physical card 30. After that, step S307 is continued.

After the UHF signal 3725 of the physical card 30 is read, the staff of the store can prepare the commodity to be exchanged in advance, and the commodity can be exchanged directly after the high-frequency signal 3715 is read. During the entire transaction process, the physical card 30 will not leave the holder of the physical card, and it does not need to contact other staff, which is a non-contact remote transaction mode. During the epidemic prevention period, keeping a safe social spacing to reduce the virus-infected channels and improve transaction security.

Figure 8:
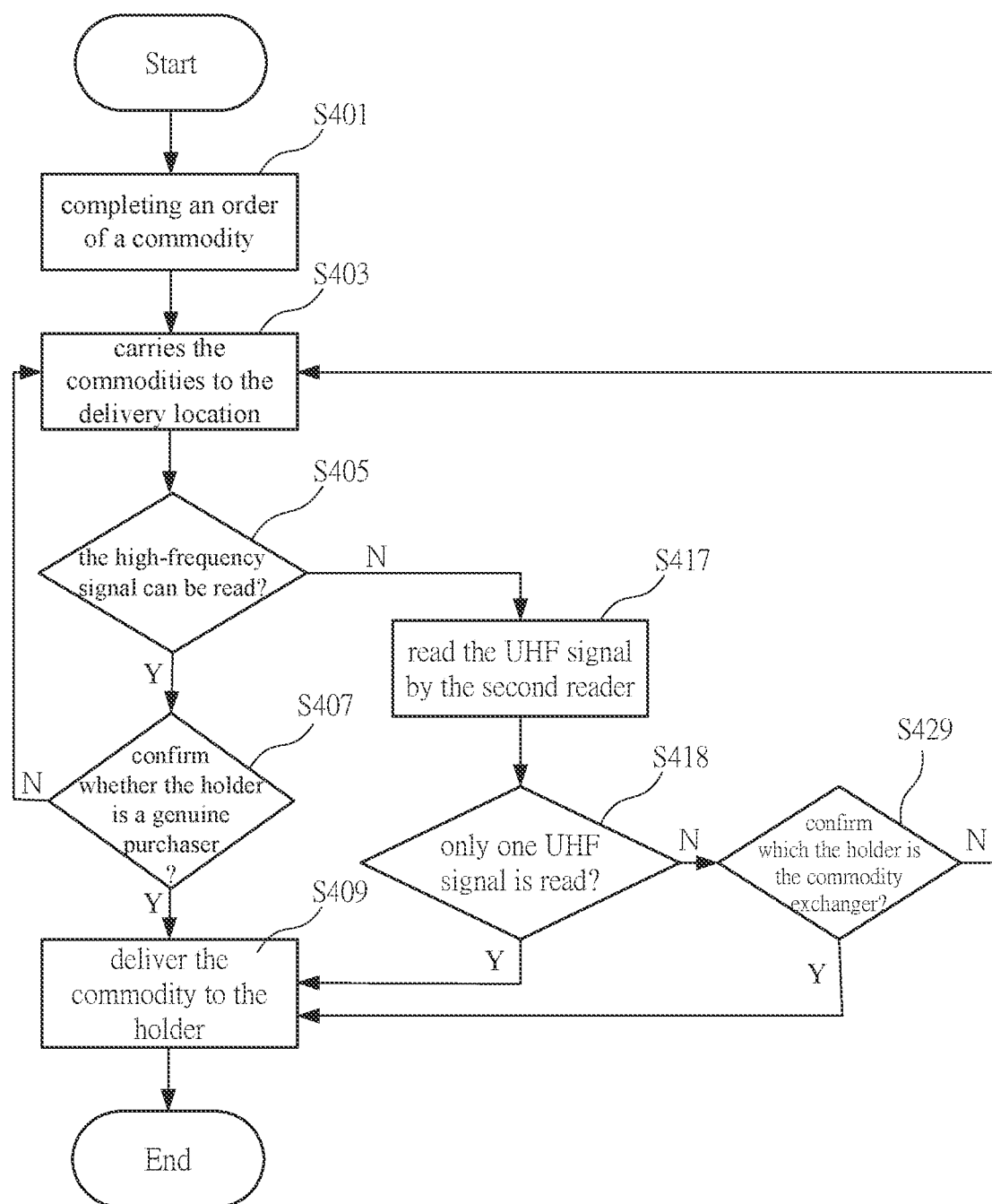
FIG. 8 is a flow chart of using a physical card according to another embodiment of the present invention.

Referring to FIG. 8 and FIG. 4, which are schematic diagrams of using another embodiment of the present invention. The physical card 30 of the present invention can be applied to a stadium or a concert venue, and can be traded or exchanged for commodities. The first reader 43 and the second reader 47 will move with a staff of a store or a seller, its use steps are as follows:

In step S401, a holder of a physical card 30 completes a transaction or an order of a commodity with an organizer (or a store) to become a member or a commodity exchanger. For example, the holder of the physical card 30 can order a commodity from the store through communication products, internet or mobile apps. The commodity can be a kind of food, a snack, a lunch box, a drink, a commemorative product, a gift or a membership.

In step S403, the staff of the store, via the call of the holder of the physical card 30 or the instruction of the store, carries the commodities to the delivery location closed to the holder of the physical card 30.

In step S405, the staff of the store judges whether the spacing between him and the holder of the physical card 30 has exceeded a reading distance, for example, the reading distance of the spacing is 1 meter. Alternatively, the high-frequency signal 3715 of the physical card 30 can be read by directly detecting with the first reader 43 of the staff. If it is within the reading distance or the high-frequency signal 3715 can be read, step S407 is performed. Otherwise, if the reading distance is exceeded or the high-frequency signal 3715 cannot be read, step S417 is performed.

Step S407, it means that the spacing between the holder and the staff of the store is within a reading distance, and the high-frequency signal 3715 can be read by the first reader 43. Therefore, the staff of the store 49 use the first reader 43 carried to read the high-frequency signal 3715 of the physical card 30 and obtain the relevant first information 485. To confirm whether the holder of the physical card 30 is a genuine purchaser of commodity. If it is the commodity purchaser, step S409 is performed. Otherwise, if it is not the commodity purchaser, go back to step S403.

In step S417, indicating that the high-frequency signal 3715 cannot be read by the first reader 43, or the spacing between the holder of the physical card 30 and the staff of the store exceeds a reading distance. Therefore, the second reader 47 carried by the staff of the store can read the UHF signal 3725 of the UHF electronic tag 372 of the physical card 30.

In step S418, is there only one UHF signal 3725 is read by the second reader 47? If only one UHF signal 3725 is read, step S409 is performed. Otherwise, if more than one UHF signal 3725 is read, step S429 is performed.

In step S429, the staff of the store requires the holder to show or call out the plain number of the physical card 30 to confirm which the holder of the physical card 30 is the real commodity exchanger or member. If the holder is the commodity exchanger, step S409 is continued. Otherwise, if the holder is not a commodity exchanger, go back to step S403.

In step S409: After confirming that the reader 43/47 has read the high-frequency signal 3715 or the UHF signal 3725, and confirming the real commodity exchanger, the staff of the store can deliver the commodity directly or pass it through other people to the holder of the physical card 30.

Since the commodity exchange is completed or the amount of the commodity exchange can be recorded in the second reader 47, the first reader 43 and/or the information application system 58, the organizer and the store can recover the commodity payments from the holder of the physical card 30 in the future. In addition, if the holder of the physical card 30 has previously linked the physical card 30 with a credit card or a debit card, the payment for the commodity can be paid directly from the credit card or the debit card. Since the physical card 30 does not need to leave the holder of the physical card 30 in the commodity transaction process, not only can the commodity transaction and exchange be completed quickly, but also the risk of the physical card 30 being stolen can be reduced. Moreover, the whole process is a non-contact transaction mode, so social safety spacing can be maintained during the epidemic prevention period and transaction security can be improved.

Figure 9:
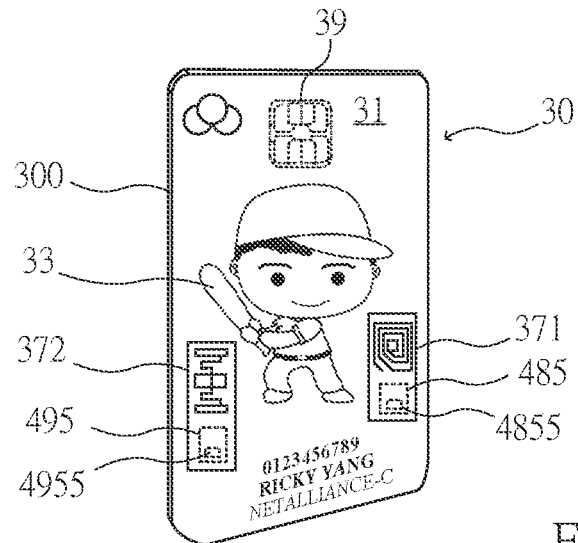
FIG. 9 is a schematic diagram of a physical card according to another embodiment of the present invention.

Furthermore, referring to FIG. 9, which is a schematic structural diagram of another embodiment of the present invention. The physical card 30 is provided with a high-frequency electronic tag 371 (HF electronic tag) and an ultra-high frequency electronic tag 372 (UHF electronic tag). The high-frequency electronic tag 371 internally stores or is electrically connected to a first information 485. The first information 485 can be read by a first reader (43) through the high-frequency electronic tag 371. In addition, the UHF electronic tag 372 internally stores or is electrically connected to a second information 495. The second information 495 is read by a second reader (47) through the UHF electronic tag 372. The physical card 30 has a financial data element 39, such as a debit card chip or a debit card magnetic stripe.

In an embodiment of the present invention, the frequency bandwidth of the high-frequency electronic tag is 13.56 MHz, the frequency bandwidth of the UHF electronic tag is 400-1000 MHz, and the frequency bandwidth of the microwave electronic tag is 2.4-6.0 GHz. The first information 485 includes a card set number, player name, card issuing manufacturer name, card issuing date, the name of the card owner, and/or first electronic wallet. The second information 495 includes a previous transaction record, the name of the card owner, nationality, transaction year, transaction cost, identification time, identification level, and/or second electronic wallet.

In an embodiment of the present invention, the first information 485 includes a first internal code 4855, and the second information 495 includes a second internal code 4955. The first internal code 4855 and the second internal code 4955 correspond to each other. The certification organization or a store can read the second internal code 4955 through the second reader 47, and read the first internal code 4855 through the first reader 43. Then, compare the corresponding relationship between the first internal code 4855 and the second internal code 4955. Is the corresponding relationship correct? If the corresponding relationship is correct, it means that the physical card 30 is a real card. Otherwise, if the corresponding relationship is not correct, it means that the high-frequency electronic tag 371 or the UHF electronic tag 372 of the physical card 30 has been forged, and it is a counterfeit card. In this way, the authenticity judgment of the physical card 30 can be improved. The certification organization 45 or the store is not only provided with a second reader 47, but may also be provided with a first reader 43.

The physical card 30 can be added value through a credit card system, a stored-value card system, or a physical machine, and the stored-value amount is stored in the first information 485 and/or the second information 495. For example, a first electronic wallet 4859 stored in the high-frequency electronic tag 371. In this way, the holder of the physical card 30 can use the physical card 30 to purchase commodity and pay fees.

Figure 10:
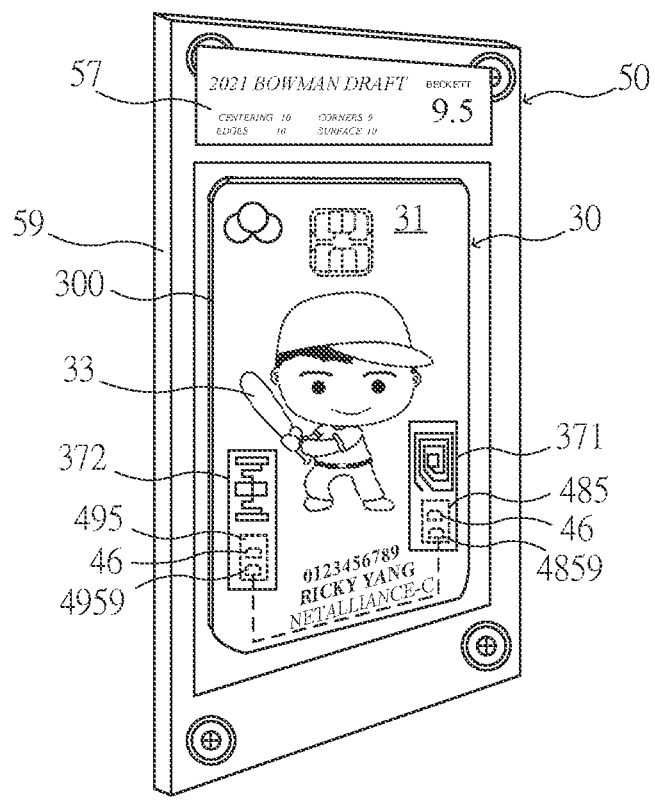
FIG. 10 is a schematic diagram of a physical card according to another embodiment of the present invention.

Referring to FIG. 10, which is a schematic diagram of the structure of an embodiment of the present invention. The present invention is applicable to an identification card 50. The identification card 50 includes a physical card 30, an authentication information 57, and a protective casing 59 is used to cover the physical card 30 and the authentication information 57. The physical card 30 includes a high-frequency electronic tag 371 and an UHF electronic tag 372. The UHF electronic tag 372 has an electronic wallet, such as a second electronic wallet 4959. In this way, the holder of the physical card 30 can use the first electronic wallet 4859 of the high-frequency electronic tag 371 or the second electronic wallet 4959 of the UHF electronic tag 372 to purchase commodity and pay for it.

In an embodiment of the present invention, the first electronic wallet 4859 can be connected to the second electronic wallet 4959. When the first electronic wallet 4859 is zero or negative, and the first electronic wallet 4859 needs to be paid, a part or all of the second electronic wallet 4959 can be transferred to the first electronic wallet 4859 via the first application system 48 or the second application system 49. Otherwise, a part or all of the first electronic wallet 4859 can also be transferred to the second electronic wallet 4959. The first application system 48 and the second application system 49 can be integrated into the same information application system 58.

The physical card 30 can be directly swiped for shopping or pre-purchasing commodity. When the pre-purchasing commodity is completed, the purchaser will receive an order number 46, which can be noted in the first information 485 and/or second information 495 of the physical card 30.

Figure 11:
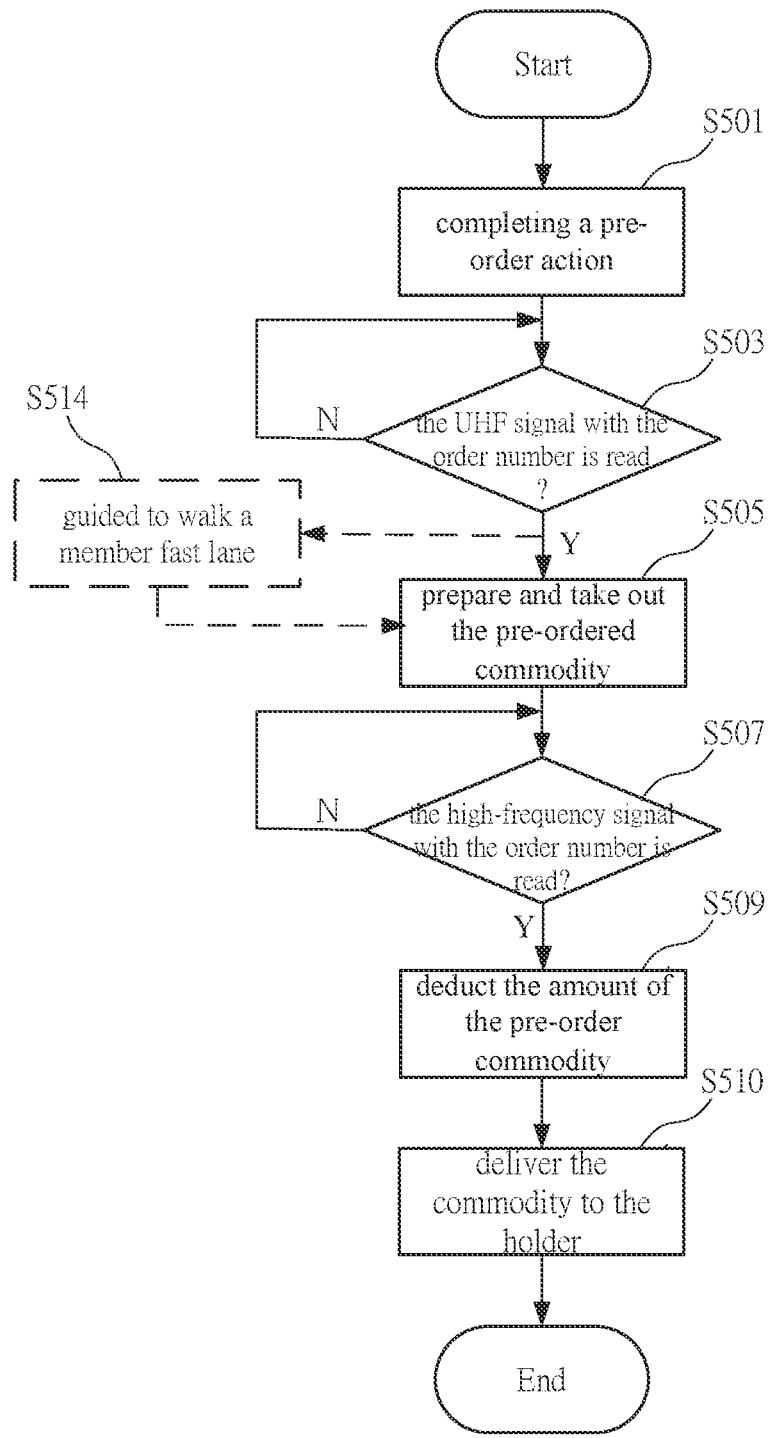
FIG. 11 is a flow chart of using a physical card according to another embodiment of the present invention.

Referring to FIG. 11, which is a flowchart of an embodiment of the present invention when in use. The physical card 30 of the present invention can be applied to an exchange commodity. Take a restaurant's meal taking system or Drive-Through® system as an example, the first reader 43 is set at a commodity exchange counter and the second reader 47 is set at an entrance of a store, its use steps are as follows:

In step S501, the holder of a physical card 30 completes a pre-order action, such as completing a reservation of commodity and/or paying an amount of money to become a member or a commodity exchanger, and has the right to exchange a commodity or service with a seller or the store. The seller, a store or a certification organization 45 will provide an order number 46 corresponding to the pre-order action of the physical card 30 and mark it respectively in the first information 485 and the second information 495. The order number 46 includes an amount of the ordered commodity, and is an exclusive unique label or a single label corresponding to the physical card 30.

In step S503, the store has the second reader 47 at the entrance of the store or at the entrance of a food pick-up lane. The second reader 47 will continue to detect whether the UHF signal 3725 with the order number 46 is read?

In step S505, the second reader 47 at the entrance has detected that the UHF signal 3725 with the order number 46 has been brought to the entrance of the store or its surroundings. The seller can know which physical card 30 is coming and the corresponding ordered commodity according to the order number 46, so the staff of the store can prepare and take out the pre-ordered commodity to be exchanged.

In step S507, the holder of the physical card 30 arrives at a commodity exchange counter in the store, and holds the physical card 30 close to the first reader 43. The first reader 43 will read the high-frequency electronic tag 371 of the physical card 30 and determine whether the physical card 30 has the order number 46 of the commodity to be exchanged?

In step S509, the first reader 43 will directly deduct the amount of the pre-order commodity from the first electronic wallet 4859 of the physical card 30 or marks a received message in said physical card 30.

In step S510, it is confirmed that the physical card 30 has paid for the commodity, so the pre-order commodity can be delivered to the holder of the physical card 30. The holder of the physical card 30 can take away the pre-order commodity and complete the transaction of the commodity.

In another embodiment of the present invention, a step S514 can be added after step S503: after the second reader 47 detects and reads the UHF signal 3725 and the order number 46, the seller's staff can guide the holder of the physical card 30 go to a member fast lane to divert with other buyers who have not pre-order commodity. This can speed up the guiding of the holder of the physical card 30 to the commodity exchange counter, and complete the commodity payment and exchange.

In the above step S501, the holder of the physical card 30 can also choose to directly pay for the commodity when ordering the commodity. In this way, when the holder of the physical card 30 arrives at the commodity exchange counter, the order number 46 can be regarded as the identity of the holder of the physical card 30, or the price of the commodity with the order number 46 is changed to zero. After the physical card 30 passes through steps S507 and S509, the holder of the physical card 30 can directly take away the ordered commodity. In addition, the order number 46 can also be set as the first internal code 4855 and/or the second internal code 4955 of the physical card 30.

Since the UHF signal 3725 of the physical card 30 can be detected and read by the second reader 47 at the entrance of the store, the staff of the store can be notified immediately to prepare or take out the ordered goods, thus shortening the transaction time of the commodity.

In addition, the physical card 30 will not leave the holder of the physical card 30 during the entire transaction, which belongs to a non-contact transaction mode, and can maintain a social safety spacing during the epidemic prevention period. The present invention can not only reduce the risk of the physical card 50 being lost or stolen, but also avoid the chance of being infected by viruses or bacteria, thereby improving the security of commercial transactions.

Figure 12:
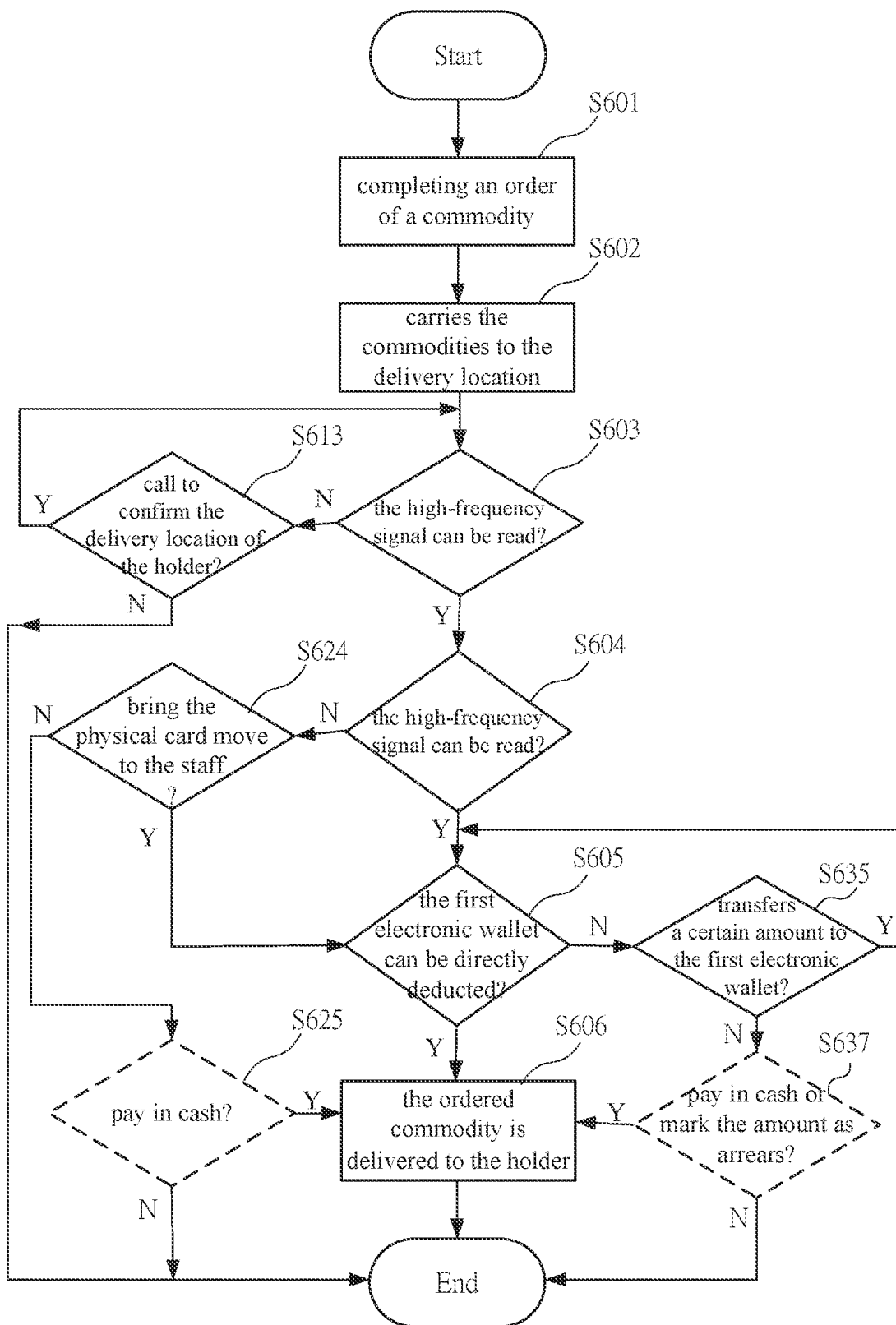
FIG. 12 is a flow chart of using a physical card according to another embodiment of the present invention.

Referring to FIG. 12, which is a schematic diagram of the use of an embodiment of the present invention. The physical card 30 is used in the commodity transaction program of a stadium or a concert. The first reader 43 and the second reader 47 will move with a staff of a store or a seller, its use steps are as follows:

In step S601, the holder of the physical card 30 completes a commodity ordering action to a seller or a store, and provides a pick-up information to the store, so as to become a member or a commodity exchanger. For example, the holder of the physical card 30 can order a commodity from the store through a communication device or at a counter. The ordered commodity can be a food, a snack, a boxed meal, a drink, a commemorative product, a gift, or a member. The pick-up data includes the stadium seat number and/or the expected delivery time of the commodity. When the commodity order is completed, the store and/or a certification organization 45 will provide an order number 46 corresponding to the ordering action of the physical card 30 and mark it in the second information 495 and/or the first information 485. The order number 46 includes an amount data of the ordered commodity and/or the pick-up data.

In step S602, according to the pick-up data, a staff of the store carries the ordered commodity to the delivery location area at the designated delivery time.

In step S603, the staff uses a second reader 47 to detect whether the UHF signal 3725 with the order number 46 can be read, and to confirm whether it is the holder of the physical card 30?

In an embodiment of the present invention, when the staff detects the UHF signal 3725 with the order number 46, the holder of the physical card 30 can be found by physical movement or mobile phone communication, and the holder of the physical card 30 is requested to indicate its order number 46, the main image data (plain number) 33 of the physical card 30, press the mobile phone confirmation command, or perform step S604 to confirm whether it is the order of the commodity.

In step S613, when the second reader 47 cannot read the UHF signal 3725, the staff can refer to the card member list 499 or the mobile phone number left by the holder of the physical card 30, call to confirm the delivery location of the holder of the physical card 30. If the delivery location of the holder of the physical card 30 is confirmed, step S603 is performed. Otherwise, if the holder of the physical card 30 is not found, the commodity transaction will be cancelled.

In step S604, the staff judges the whether the spacing between him and the holder of the physical card 30 has exceeded a reading distance or the high-frequency signal 3715 of the physical card 30 can be read by directly detecting with the first reader 43 of the staff? If the high-frequency signal 3715 is read, step S605 is performed. Otherwise, if the high-frequency signal 3715 cannot be read, step S624 is performed.

In step S624, the first reader 43 cannot read the high-frequency signal 3715, so the holder of the physical card 30 is asked to bring the physical card 30 move to the staff, and perform step S605. Otherwise, if the holder of the physical card 30 does not move the location, the commodity transaction is cancelled or step S625 is performed.

In step S605, the first reader 43 can determine whether the order number 46 in the high-frequency signal 3715 is correct and whether the first electronic wallet 4859 of the high-frequency electronic tag 371 can be directly deducted? If the deductible or the amount of the commodity is zero, step S606 is performed. Otherwise, proceed to step S635.

In step S635, indicating that the first electronic wallet 4859 of the high-frequency electronic tag 3721 is lower than the amount of the commodity, so it is confirmed whether the physical card 30 has the function of transferring the electronic wallet? If the electronic wallet 4859 can be transferred, after the credit card or debit card transfers a certain amount to the first electronic wallet 4859, proceed to step S605. Otherwise, cancel the commodity transaction or proceed to step 637.

In step S606, the staff has confirmed the identity of the order and has also received the payment for the commodity, so the ordered commodity is delivered to the holder of the physical card 30 to complete the transaction of the commodity.

In an embodiment of the present invention, after step S624, a step S625 can be added. Does the holder of the physical card 30 agree to choose pay in cash and ask other viewers to submit cash and merchandise? If agreed, proceed to step S606. Otherwise, the commodity transaction is cancelled.

In an embodiment of the present invention, after step S635, a step S637 can be added. When the first electronic wallet 4859 is lower than the amount of the commodity, and the physical card 30 does not have the function of transferring stored value, the holder of the physical card 30 can decide whether to agree to pay in cash or mark the amount of the first stored value 4859 as arrears (mark an overdue message). If agreed, proceed to step S606. Otherwise, cancel the commodity transaction.

The unpaid amount of the commodity can be recorded in the second reader 47, the first reader 43, the first application system 48 and/or the second application system 49, and the payment can be recovered from the physical card 30 afterwards. Of course, the holder of the physical card 30 can already set the physical card 30 to be paid by a credit card or a debit card in advance.

Figure 13:
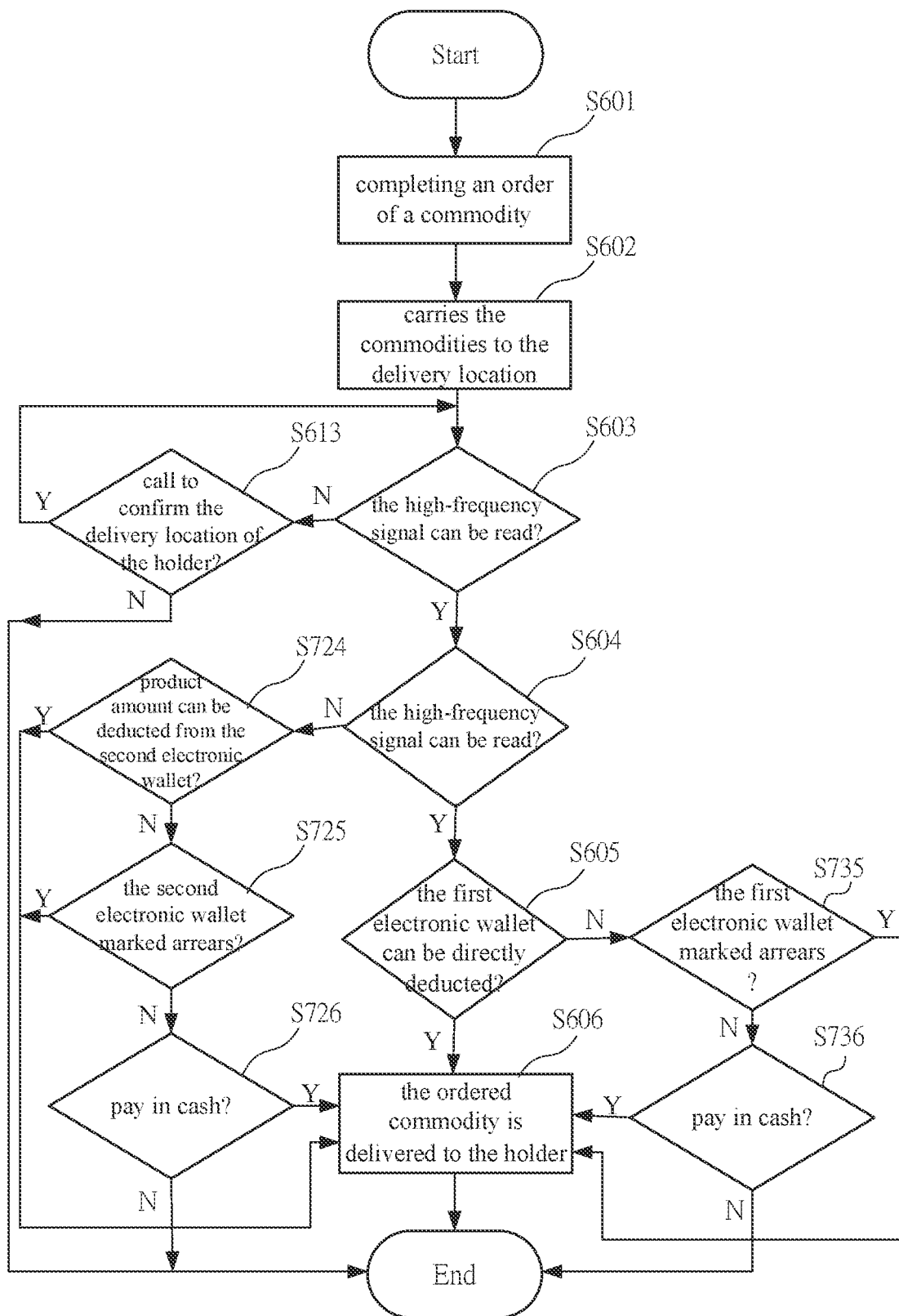
FIG. 13 is a flow chart of using a physical card according to another embodiment of the present invention.

Referring to FIG. 13, which is a flowchart of another embodiment of the present invention. The steps S601 to S606 and S613 are the same as those in FIG. 12. However, after step S604 is performed, if the first reader 43 of the staff cannot read the high-frequency signal 3715 of the physical card 30, step S724 is performed.

In step S724, the second reader 47 of the store can read the UHF signal 3725 of the physical card 30, and confirm whether the product amount can be directly deducted from the second electronic wallet 4959 of the UHF electronic tag 372? If it can be deducted or the amount of the product is marked as zero, then step S606 is performed. Otherwise, proceed to step S725.

In step S725, the second reader 47 directly debits the product amount from the first electronic wallet 4859 of the high-frequency electronic tag 371 and marks a received message in said physical card 30, or transfers the amount from the credit card or the first electronic wallet 4859 into the second electronic wallet 4959 and then debits, or deducts the second electronic wallet 4959 marked arrears (mark an overdue message). If agreed, proceed to step S606. Otherwise, proceed to step S726.

In step S726, does the holder of the physical card 30 agree to choose pay in cash, and ask other viewers to submit cash and commodity? If agreed, proceed to step S606. Otherwise, the commodity transaction is cancelled.

Furthermore, after step S605, if the first reader 43 cannot deduct the first electronic wallet 4859 of the physical card 30, then step S735 is executed: the first reader 43 deducts the product amount form the second electronic wallet 4959, or the transfer amount from the credit card is entered into the first electronic wallet 4859 and then deducted, or the first electronic wallet 4859 is marked as arrears (mark an overdue message). If agreed, proceed to step S606. Otherwise, proceed to step S736.

In step S736, does the holder of the physical card 30 agree to choose pay in cash? If agreed, proceed to step S606. Otherwise, the commodity transaction is cancelled.

The foregoing embodiment can also achieve a contactless transaction mode, and the physical card 30 does not need to leave the holder, which not only reduces the stolen recording of the physical card and reduces the path of virus infection, but also shortens the commodity transaction time.

Figure 14:
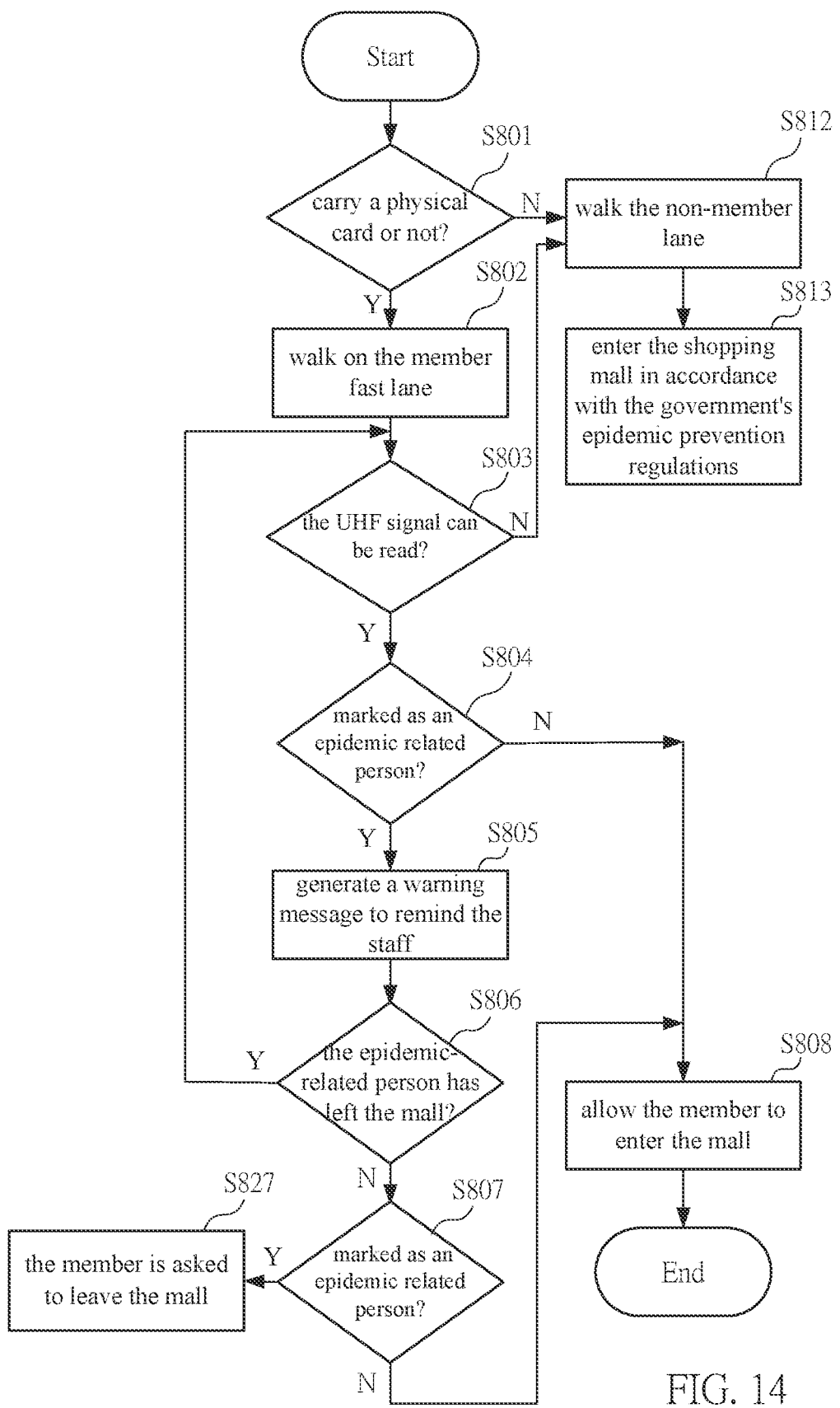
FIG. 14 is a flow chart of using a physical card according to another embodiment of the present invention.

Finally, please refer to FIG. 14, which is a flowchart of another embodiment of the present invention. The physical card 30 of the present invention can be used as an epidemic prevention tool. The second reader 47 is set at an entrance of a store, its use steps are as follows:

In step S801, a second reader 47 is set at the entrance of a shopping mall or the store, and the entrance of the shopping mall can be divided into a member fast lane and a non-member lane. Those who want to enter the mall decide which lane to walk according to whether they carry a physical card 30 or not? If the physical card 30 is carried, step S802 is performed to walk on the member fast lane. Otherwise, if the physical card 30 is not carried, step S812 is performed to walk the non-member lane.

In step S803, the second reader 47 of the shopping mall will detect whether the UHF signal 3725 of a physical card 30 can be read. If the UHF signal 3725 is read, step S804 is performed. Otherwise, if the UHF signal 3725 is not read, step S812 is performed, and the consumer is asked to walk through the non-member lane.

In step S804, the second reader 47 of the shopping mall will check whether the second information 495 or the card member list 499 corresponding to the UHF electronic tag 372 is marked as an epidemic related person? If the person is not related to the epidemic, step S808 is performed to allow the member with the physical card 30 to enter the shopping mall.

In step S805, a warning device at the entrance of the shopping mall will generate a warning message to remind the staff of the shopping mall not to allow the member of the physical card 30 to enter the shopping mall directly. The warning device at the entrance of the shopping mall includes a warning light, an alarm sound and/or a communicator of the mall security guard. For example, when the communicator of the shopping mall security guard generates vibrations or noises, the shopping mall security guard must ask the member of the physical card 30 to leave the mall or move to a control area for an epidemic prevention measure.

In step S806, the shopping mall security guard judges whether the member of the physical card 30 set as the epidemic-related person has left the mall? If the member has left, step S803 is performed again. Otherwise, if the shopping mall security guard is uncertain whether the member involved in the epidemic has left, step S807 is performed.

In step S807, there is a first reader 43 at the entrance of the mall or the store. The first reader 43 can read the high-frequency signal 3715 of the physical card 30 that wants to enter the mall, and check the first information 485 or the card member list 499 has been labeled as an epidemic related person? If the member is an epidemic-related person, step S827 is performed, and the member is asked to leave the mall. Otherwise, if the member is not related to the epidemic, the member carrying the physical card 30 can be allowed to enter the mall, and step S808 is performed.

In step S813, consumers who walk through the non-member lane enter the shopping mall in accordance with the government's epidemic prevention regulations. For example, consumers need to fill in their name and contact information. In an embodiment of the present invention, when step S803 is performed, the second reader 47 of the mall will read the UHF signal 3725 of the physical card 30, and at the same time, note the information that the physical card 30 has been to the mall in second information 495, first information 485 and/or card member list 499. The member carrying the physical card 30 does not need to fill in the name or contact information before entering the shopping mall. Therefore, the present invention can not only shorten the commodity transaction time, but also isolate the virus transmission channel to improve transaction security.

When a member of the physical card 30 is diagnosed to be an epidemic-related person, the relevant government unit will connect and record their information in the second information 495, first information 485 and/or card member list 499.

In an embodiment of the present invention, step S805 also includes: if there are multiple physical cards 30 are read at the same time, and it is impossible to determine which member is listed as the relevant person of the epidemic, the staff of the mall will temporarily close the member's fast lane, and prohibit everyone in the area from entering the mall.

The above disclosure is only the preferred embodiment of the present disclosure, and not used for limiting the scope of the present disclosure. All equivalent variations and modifications on the basis of shapes, structures, features and spirits described in claims of the present disclosure should be included in the claims of the present disclosure.

What is claimed is:

1. A method for using a physical card, applied to an exchange of a commodity, comprising:
configured a first reader that is used for reading a high-frequency signal and owned by a seller;
configured a second reader that is used for reading an ultra-high frequency signal and owned by said seller;
providing said physical card configured with at least one high-frequency electronic tag for generating said high-frequency signal and at least one ultra-high frequency electronic tag for generating said ultra-high frequency signal to a user;
completing an order of said commodity by the user to make that the user becomes a commodity exchanger;
requiring a staff of said seller to transport said commodity to a delivery location designated by the user;
requiring said staff of said seller to confirm whether the user is the commodity exchanger by using said first reader to read said high-frequency signal generated from said at least one high-frequency electronic tag of said physical card held by the user;
requiring said staff of said seller to confirm whether the user is the commodity exchanger by using said second reader to read said ultra-high frequency signal generated from said at least one ultra-high frequency electronic tag of said physical card held by the user if said first reader fails to read said high-frequency signal; and
requiring said staff of said seller to deliver said commodity ordered by the user to the user after confirming that the user is said commodity exchanger.

2. The method according to claim 1, further comprising:
requiring said staff of said seller to confirm whether the user is said commodity exchanger by reviewing a plaintext information presented on said physical card held by the user when said second reader has read a plurality of said ultra-high frequency signals.

3. The method according to claim 1, further comprising:
obtaining an order number when the user of said physical card completes said order of said commodity;

embedding said order number into said high-frequency signal generated from said at least one high-frequency electronic tag of said physical card held by the user;

configuring a first electronic wallet in said at least one high-frequency electronic tag of said physical card; and deducting a commodity payment from said first electronic wallet of said at least one high-frequency electronic tag when said first reader reads said high-frequency signal with said order number or marking a commodity received message in said physical card when said first reader reads said high-frequency signal with said order number.

4. The method according to claim 1, further comprising:

configuring a second electronic wallet in said at least one ultra-high frequency electronic tag of said physical card; and deducting a commodity payment from said second electronic wallet of said ultra-high frequency electronic tag, transferring a certain amount from a credit card to said second electronic wallet when an amount stored in said second electronic wallet is lower than a price of said commodity to ensure that said second electronic wallet stores a sufficient amount capable of paying said commodity, marking a shortfall amount message in said second electronic wallet when said amount stored in said second electronic wallet is lower than said price of said commodity, or paying for said commodity in cash when said amount stored in said second electronic wallet is lower than said price of said commodity.

5. The method according to claim 3, further comprising: transferring a certain amount from a credit card to said first electronic wallet when an amount stored in said first electronic wallet is lower than a price of said commodity so as to ensure that said first electronic wallet stores a sufficient amount capable for paying said commodity, or marking a shortfall amount message in said first electronic wallet when said amount stored in said first electronic wallet is lower than said price of said commodity, or paying for said commodity in cash when said amount stored in said first electronic wallet is lower than said price of said commodity.

* * * * *